(12) United States Patent
Watanabe et al.

(10) Patent No.: US 8,679,998 B2
(45) Date of Patent: Mar. 25, 2014

(54) CORROSION-RESISTANT MEMBER FOR SEMICONDUCTOR MANUFACTURING APPARATUS AND METHOD FOR MANUFACTURING THE SAME

(71) Applicant: NGK Insulators, Ltd., Nagoya (JP)

(72) Inventors: Morimichi Watanabe, Nagoya (JP); Yuji Katsuda, Tsushima (JP); Toru Hayase, Nagoya (JP); Asumi Jindo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/624,087

(22) Filed: Sep. 21, 2012

(65) Prior Publication Data
US 2013/0023401 A1  Jan. 24, 2013

Related U.S. Application Data

(63) Continuation of application No. PCT/JP2011/056624, filed on Mar. 18, 2011.

(30) Foreign Application Priority Data

Mar. 30, 2010  (JP) .................... 2010-079251

(51) Int. Cl.
C04B 35/50 (2006.01)
C04B 35/51 (2006.01)
C04B 35/00 (2006.01)
A23B 4/16 (2006.01)

(52) U.S. Cl.
USPC ............................ 501/152; 501/126; 423/263

(58) Field of Classification Search
USPC ................................... 501/126, 152; 423/263
See application file for complete search history.

(56) References Cited

U.S. PATENT DOCUMENTS 6,508,884 B2 * 1/2003 Kuibira et al. ............... 118/725
6,825,144 B2 * 11/2004 Hideki et al. ................ 501/152

(Continued)

FOREIGN PATENT DOCUMENTS

CN  101514100 A  8/2009
JP  10-004083 A1  1/1998

(Continued)

OTHER PUBLICATIONS

Acros Organics. Material Safety Data Sheet, Holmium (III) oxide. MSDS #42906.*

(Continued)

*Primary Examiner* — Kaj K Olsen
*Assistant Examiner* — Noah Wiese
(74) *Attorney, Agent, or Firm* — Burr & Brown, PLLC

(57) ABSTRACT

Initially, an $Yb_2O_3$ raw material was subjected to uniaxial pressure forming at a pressure of 200 $kgf/cm^2$, so that a disc-shaped compact having a diameter of about 35 mm and a thickness of about 10 mm was produced, and was stored into a graphite mold for firing. Subsequently, firing was performed by using a hot-press method at a predetermined firing temperature (1,500° C.), so as to obtain a corrosion-resistant member for semiconductor manufacturing apparatus. The press pressure during firing was specified to be 200 $kgf/cm^2$ and an Ar atmosphere was kept until the firing was finished. The retention time at the firing temperature (maximum temperature) was specified to be 4 hours. In this manner, the corrosion-resistant member for semiconductor manufacturing apparatus made from an $Yb_2O_3$ sintered body having an open porosity of 0.2% was obtained.

9 Claims, 1 Drawing Sheet

(56) References Cited

U.S. PATENT DOCUMENTS

| | | | |
|---|---|---|---|
| 6,888,236 B2 * | 5/2005 | Hiramatsu et al. | 257/703 |
| 6,916,559 B2 * | 7/2005 | Murakawa et al. | 428/697 |
| 7,435,698 B2 * | 10/2008 | Ide et al. | 501/152 |
| 2007/0218302 A1 | 9/2007 | Kobayashi et al. | |
| 2008/0207432 A1 | 8/2008 | Hamada | |

FOREIGN PATENT DOCUMENTS

| | | |
|---|---|---|
| JP | 10-045461 A1 | 2/1998 |
| JP | 10-045467 A1 | 2/1998 |
| JP | 10-053462 A1 | 2/1998 |
| JP | 2002-222803 A1 | 8/2002 |
| JP | 2002-362966 A1 | 12/2002 |
| JP | 2006-100705 A1 | 4/2006 |
| WO | 2005/009919 A1 | 2/2005 |
| WO | 2007/108546 A1 | 9/2007 |

OTHER PUBLICATIONS

ESPI Metals. Holmium Oxide Material Safety Data Sheet. CAS No. 12055-62-8.*

Analytyka. Holmium (III) Oxide, CAS No. 12055-62-8.*

International Search Report and Written Opinion dated May 17, 2011 (with English translation).

Chinese Office Action (Application No. 201180015793.9) dated Aug. 22, 2013 (with English translation).

* cited by examiner

CORROSION-RESISTANT MEMBER FOR SEMICONDUCTOR MANUFACTURING APPARATUS AND METHOD FOR MANUFACTURING THE SAME

BACKGROUND OF THE INVENTION

1. Field of the Invention

The present invention relates to a corrosion-resistant member for semiconductor manufacturing apparatus and a method for manufacturing the same.

2. Description of Related Art

In a semiconductor manufacturing apparatus used for performing a dry process, plasma coating, or the like in production of a semiconductor, a highly reactive F or Cl based plasma is used for etching or cleaning. Therefore, a member used for such an apparatus necessarily has high corrosion resistance, and a member, e.g., an electrostatic chuck or a heater, which comes into contact with a Si wafer is required to have still higher corrosion resistance. Patent Document 1 discloses $Yb_2O_3$ and $Dy_2O_3$ thin films formed by a PVD method as corrosion-resistant members capable of responding to such a demand. The etching rates of these thin films are very small as compared with the etching rates of an alumina sintered body and the like.

CITATION LIST

Patent Document

Patent Document 1: Japanese Unexamined Patent Application Publication No. 2002-222803

However, the thin film undergoes plasma etching easily because pores and cracks are included easily during film formation and, in addition, influences may be exerted on device characteristics because of peeling and the like along with proceeding in corrosion and repeated use on the basis of differences in properties between the thin film and a base material and an adhesion problem. Consequently, application to an electrostatic chuck and the like has problems. Sintered bodies are suitable for these members. However, in Patent Document 1 described above, $Yb_2O_3$ and $Dy_2O_3$ thin films formed by the PVD method are evaluated, although a sintered body is not evaluated. Sintered bodies of $Y_2O_3$ and $Al_2O_3$ are known as corrosion-resistant members, but development of sintered body materials capable of further reducing the etching rates has been desired.

The present invention has been made to solve the above-described problems and it is a main object to provide a sintered body serving as a corrosion-resistant member for semiconductor manufacturing apparatus and exhibiting a reduced etching rate smaller than the etching rates of previously known sintered bodies.

The present inventors performed intensive research on the possibility of application of sintered bodies of rare-earth oxides to corrosion-resistant members for semiconductor manufacturing apparatus. As a result, it was found that an effect of reducing the etching rate increased significantly when sintered bodies of some rare-earth oxides among them satisfy specific properties, and the present invention has been made.

SUMMARY OF THE INVENTION

A corrosion-resistant member for semiconductor manufacturing apparatus of the present invention comprises a sintered body having an open porosity of 0.3% or less and containing at least one type selected from the group consisting of ytterbium oxide, holmium oxide, dysprosium oxide, and erbium oxide.

A method for manufacturing a corrosion-resistant member for semiconductor manufacturing apparatus of the present invention includes the step of subjecting at least one type of oxide raw material selected from the group consisting of ytterbium oxide, holmium oxide, dysprosium oxide, and erbium oxide to (a) forming into the shape of a desired corrosion-resistant member for semiconductor manufacturing apparatus without using a sintering aid and, thereafter, hot-press firing in an inert atmosphere at a predetermined firing temperature or (b) forming into the shape of a desired corrosion-resistant member for semiconductor manufacturing apparatus together with a sintering aid which is a fluoride of at least one type of element selected from the group consisting of Mg, Ca, and Sr and, thereafter, hot-press firing in an inert atmosphere at a temperature lower than the predetermined firing temperature, so as to sinter the oxide raw material and obtain a sintered body having an open porosity of 0.3% or less.

According to the corrosion-resistant member for semiconductor manufacturing apparatus of the present invention, the reduced etching rate smaller than the etching rates of previously known yttria sintered body and alumina sintered body can be exhibited. Therefore, the amount of particle generated from the corrosion-resistant member is reduced, and it is possible to endure highly reactive F or Cl based plasma used in a semiconductor production process for a long period. These materials have a high volume resistivity of $1 \times 10^{15}$ Ω·cm or more and are suitable for electrostatic chucks and heater materials. Meanwhile, the method for manufacturing a corrosion-resistant member for semiconductor manufacturing apparatus according to the present invention is suitable for production of such a corrosion-resistant member. In particular, in the case where a sintering aid is added, the production cost is reduced because a dense body is obtained at low temperatures.

DETAILED DESCRIPTION OF THE INVENTION

Figure 1:
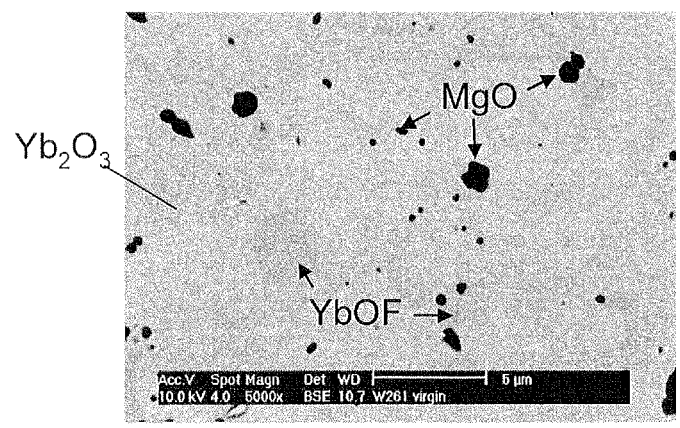
FIG. 1 is a back-scattered electron image of a cross-section (polished surface) of a sintered body in Example 7.

A corrosion-resistant member for semiconductor manufacturing apparatus of the present invention comprises a sintered body having an open porosity of 0.3% or less and containing at least one type selected from the group consisting of ytterbium oxide, holmium oxide, dysprosium oxide, and erbium oxide.

A sintered body containing at least one type selected from the group consisting of ytterbium oxide, holmium oxide, dysprosium oxide, and erbium oxide is used as the sintered body. They are sintered bodies of rare-earth oxides. Even a sintered body of the rare-earth oxide, for example, a sintered body of gadolinium oxide has a problem in densification. A sintered body of europium oxide can be densified, but is not suitable because the etching rate cannot be reduced sufficiently. A sintered body of neodymium oxide is not suitable because of disintegration during storage in the air. Alternatively, a sintered body containing a plurality of types selected from the above-described group can also be used, and a sintered body containing one type selected from the above-described group may also be used. Preferably, the amount of impurity metals of the oxide raw material used in production of the sintered body is minimized. For example, the amount of impurity metals is preferably 0.1 percent by weight or less of the oxide.

Here, the open porosity is specified to be a value measured by an Archimedes method, where the medium is pure water. The open porosity exceeding 0.3% is not preferable because the etching rate may increase and the strength may be reduced. Preferably, the open porosity is brought close to zero as much as possible. Consequently, a lower limit value is not particularly specified.

In the corrosion-resistant member for semiconductor manufacturing apparatus according to the present invention, grain boundary phases containing at least one type selected from the group consisting of Mg, Ca, and Sr and at least one type of O and F may be dispersed in the sintered body. For example, grain boundary phases containing MgO may be dispersed, or grain boundary phases containing Ca and F may be dispersed. Such grain boundary phases are generated when firing is performed together with a sintering aid (for example, $MgF_2$, $CaF_2$, or the like) containing Mg, Ca, or Sr. The use of such a sintering aid can lower the firing temperature, so that energy consumption is reduced correspondingly and the production cost is reduced.

Preferable examples of corrosion-resistant members for semiconductor manufacturing apparatus according to the present invention include a corrosion-resistant member made from ytterbium oxide having a bulk density of 8.8 to 9.2 g/cm$^3$. In this case, not only the etching rate is reduced sufficiently, but also the strength increases by dispersing the above-described grain boundary phases. Alternatively, a corrosion-resistant member made from holmium oxide having a bulk density of 8.1 to 8.4 g/cm$^3$ is mentioned as a preferable example.

The method for manufacturing a corrosion-resistant member for semiconductor manufacturing apparatus, according to the present invention, includes the step of subjecting at least one type of oxide raw material selected from the group consisting of ytterbium oxide, holmium oxide, dysprosium oxide, and erbium oxide to (a) forming into the shape of a desired corrosion-resistant member for semiconductor manufacturing apparatus without using a sintering aid and, thereafter, hot-press firing in an inert atmosphere at a predetermined firing temperature or (b) forming into the shape of a desired corrosion-resistant member for semiconductor manufacturing apparatus together with a sintering aid which is a fluoride of at least one type of element selected from the group consisting of Mg, Ca, and Sr and, thereafter, hot-press firing in an inert atmosphere at a temperature lower than the predetermined firing temperature, so that the above-described oxide raw material is sintered and a sintered body having an open porosity of 0.3% or less is obtained. This manufacturing method is suitable to obtain the corrosion-resistant member for semiconductor manufacturing apparatus according to the present invention.

Here, an atmosphere which does not exerts an influence on firing of the oxide raw material is good enough for the inert atmosphere. For example, a nitrogen atmosphere, an argon atmosphere, a helium atmosphere, and the like are mentioned. The firing temperature and the press pressure during the hot press may be set appropriately in accordance with the type of the oxide raw material insofar as the temperature and the pressure are suitable to obtain a dense sintered body having an open porosity of 0.3% or less. For example, the firing temperature may be set between 1,500° C. and 1,800° C. and the press pressure may be set between 100 and 300 kgf/cm$^2$. Furthermore, the pressure during forming is not specifically limited and may be set at an appropriate pressure at which the shape can be maintained.

EXAMPLES

Favorable examples of the present invention will be described below. Commercially available powders having purities of 99.9% or more and average particle diameters of 1 μm or less were used as $Yb_2O_3$, $Er_2O_3$, $Ho_2O_3$, $Dy_2O_3$, $Gd_2O_3$, $Nd_2O_3$, $Eu_2O_3$, and $Y_2O_3$ raw materials. A commercially available powder having a purity of 99.5% or more and an average particle diameter of 0.5 μm was used as an $Al_2O_3$ raw material. A commercially available powder having a purity of 99.9% or more was preliminarily pulverized to 0.5 to 1 μm, as necessary, and was used as a $MgF_2$ raw material. A similar powder was used as a $CaF_2$ raw material. In this regard, pot mill pulverization was performed as the preliminary pulverization, where a solvent was specified to be isopropyl alcohol, and zirconia balls were used.

Examples 1 to 7, Comparative Examples 1 to 6

In Examples 1 to 5 and Comparative examples 1 to 6, a rare-earth oxide raw material was used alone and a corrosion-resistant member for semiconductor manufacturing apparatus was produced. Concretely, initially, a rare-earth oxide powder shown in Table 1 was subjected to uniaxial pressure forming at a pressure of 200 kgf/cm$^2$, so that a disc-shaped compact having a diameter of about 50 mm and a thickness of about 10 mm was produced and was stored into a graphite mold for firing. Subsequently, firing was performed by using a hot-press method at a predetermined firing temperature (refer to Table 1), so as to obtain a corrosion-resistant member for semiconductor manufacturing apparatus. The press pressure during firing was specified to be 200 kgf/cm$^2$ and an Ar atmosphere was kept until the firing was finished. The retention time at the firing temperature (maximum temperature) was specified to be 4 hours.

In Examples 6 and 7, two types of rare-earth oxide powders were used and a corrosion-resistant member for semiconductor manufacturing apparatus was produced. Concretely, initially, two types of rare-earth oxide powders shown in Table 1 were weighed, and were wet-mixed for 4 hours, where isopropyl alcohol was employed as a solvent, and a nylon pot and alumina balls having a diameter of 5 mm were used. After mixing, a slurry was taken out and was dried in a nitrogen gas stream at 110° C. Subsequently, mixed powder was produced by passing through a 30 mesh sieve. The resulting mixed powder was used and forming and firing were performed in the same manner as that in Examples 1 to 5 and Comparative examples 1 to 6. In this regard, the expression "$Yb_2O_3$/25 mol % $Ho_2O_3$" in Table 1 refers to a mixed powder in which 25 percent by mole of $Ho_2O_3$ is added to 100 percent by mole of $Yb_2O_3$.

Each of the resulting sintered bodies was worked for various evaluations, and the following evaluations were performed. Each evaluation result is as shown in Table 1.

(1) Open Porosity and Bulk Density

The measurement was performed by an Archimedes method, where the medium was pure water. A sample having a shape worked into the same shape as that described in an item (2) was used.

(2) Strength

The strength was calculated by working into the shape of 3 mm×4 mm×40 mm based on JTS R1601 and performing a four-point bending test.

(3) Evaluation of Crystal Phase

A sintered body was pulverized with a mortar, and a crystal phase was identified with an X-ray diffractometer. The measurement conditions were specified to be CuKα, 40 kV, 40 mA, and 2θ=10°-70°, and a sealed tube type X-ray diffractometer (D8 ADVANCE produced by Bruker AXS K.K.) was used.

(4) Evaluation of Grain Boundary Phase

Grain boundary phases in a composite material were evaluated on the basis of SEM/EDS observation of crystal phases of a sintered body and a mirror-finished sintered body.

(5) Etching Rate

The surface of each sintered body was mirror-finished, and a corrosion resistance test was performed by using an ICP plasma corrosion resistance test apparatus under the following condition. The etching rate of each material was calculated by dividing a height difference between an unexposed surface and an exposed surface, measured with a surface roughness meter, by a test time.

ICP: 800 W, bias: 450 W, gas flow: $NF_3/O_2/Ar=75/35/100$ sccm 0.05 Torr, exposure time: 10 h, sample temperature: room temperature (6) Chemical Analysis The amount of impurity metals (metal elements excluding Yb, Ho, Dy, Er, Mg, Ca, and Sr) in the sintered body was analyzed on the basis of inductively coupled plasma (ICP) emission spectrometry and inductively coupled plasma (ICP) mass spectrometry.

(7) Measurement of Volume Resistivity

The measurement was performed in the air at room temperature by a method on the basis of JIS C2141. The shape of the test piece was specified to be diameter 50 mm×0.5 to 1 mm, and the individual electrodes were formed from silver in such a way that a main electrode had a diameter of 20 mm, a guard electrode had an inside diameter of 30 mm and an outside diameter of 40 mm, and an application electrode had a diameter of 40 mm. An applied voltage was specified to be 2 kV/mm, a current value was read one minute after voltage application, and the volume resistivity at room temperature was calculated from the current value.

[Evaluation Results]

As shown in Table 1, in Examples 1 to 4, each of $Yb_2O_3$, $Er_2O_3$, $Ho_2O_3$, and $Dy_2O_3$ was used alone, densification was performed at a firing temperature of 1,500° C. and, as a result, the etching rate was 224 to 252 nm/h, so that the corrosion resistance was high. Meanwhile, in Example 5, $Yb_2O_3$ was densified at a firing temperature of 1,800° C. and, as a result, the etching rate was 210 nm/h, so that the corrosion resistance was improved as compared with the corrosion resistance in Example 1. The reason for the improvement in corrosion resistance in Example 5 is estimated that the grain diameter increase due to the higher firing at a higher temperature is leading to the smaller area of grain boundaries which have low corrosion resistance to grains. Thereby, the corrosion resistance was improved as a whole. The materials in Examples 1 to 5 had high volume resistivities of $1\times10^{15}$ Ω·cm or more and were suitable for electrostatic chucks and heater materials. In Example 6 and Example 7, a mixed powder of $Yb_2O_3$ and $Ho_2O_3$ and a mixed powder of $Yb_2O_3$ and $Er_2O_3$, respectively, were used and densification was performed at a firing temperature of 1,500° C. As a result, there were tendencies that the corrosion resistance was excellent as compared with Comparative examples 1 to 6 and the strength increased and the volume resistivity also increased as compared with Example 1 (single component). In these Examples 6 and 7, the peak of $Yb_2O_3$ shifted to a low angle side and the peaks of $Ho_2O_3$ and $Er_2O_3$ were not detected on the basis of XRD analysis and, therefore, it is believed that an $Yb_2O_3$—$Ho_2O_3$ solid solution ($Yb_2O_3$—$Ho_2O_3$ ss) and $Yb_2O_3$—$Er_2O_3$ solid solution ($Yb_2O_3$—$Er_2O_3$ ss), respectively, were formed.

Meanwhile, in Comparative examples 1 and 2, $Y_2O_3$ was fired at 1,500° C. and $Al_2O_3$ was fired at 1,700° C., respectively. Although these sintered materials have fully densified, the corrosion resistance was inferior to those in Examples 1 to 4. In Comparative example 3, $Yb_2O_3$ was fired at 1,300° C. and, as a result, the corrosion resistance was inferior to those in Examples 1 to 4 because the open porosity was 4.6% and there were a lot of pores. In Comparative examples 4 and 5, $Gd_2O_3$ and $Eu_2O_3$, respectively, were fired at 1,500° C. and, as a result, the corrosion resistance of $Gd_2O_3$ was inferior to those in Examples 1 to 4 because the open porosity was 2.5% and there were a lot of pores. Grain boundaries of $Eu_2O_3$ had very low corrosion resistance, and it is believed that fluorine entered the inside of the sintered body through grain boundaries and corrosion proceeded. One of the factors of high corrosion resistance of $Yb_2O_3$, $Er_2O_3$, $Ho_2O_3$, and $Dy_2O_3$ among rare-earth oxides is estimated that the corrosion resistance of grain boundaries of them are higher than the corrosion resistance of $Eu_2O_3$. In Comparative example 6, $Nd_2O_3$ was fired at 1,500° C. However, the sintered body disintegrated after several days of storage in the air, so that evaluation was impossible.

TABLE 1

| Composition | Raw material | Firing temperature (° C.) | Bulk density (g/cm³) | Open porosity (%) | Strength (Mpa) | Amount of impurity metals (wt %) | NF₃ Etching rate (nm/h) | Crystal phase | Volume resistivity (Ω · cm) |
|---|---|---|---|---|---|---|---|---|---|
| Example 1 | $Yb_2O_3$ | 1500 | 9.19 | 0.2 | 140 | <0.1 | 224 | $Yb_2O_3$ | 2.1E+15 |
| Example 2 | $Er_2O_3$ | 1500 | 8.62 | 0.2 | 240 | <0.1 | 252 | $Er_2O_3$ | 1.7E+17 |
| Example 3 | $Ho_2O_3$ | 1500 | 8.37 | 0.2 | 140 | <0.1 | 249 | $Ho_2O_3$ | 2.1E+15 |
| Example 4 | $Dy_2O_3$ | 1500 | 8.14 | 0.1 | 170 | <0.1 | 252 | $Dy_2O_3$ | 5.3E+15 |
| Example 5 | $Yb_2O_3$ | 1800 | 9.2 | <0.1 | 110 | <0.1 | 210 | $Yb_2O_3$ | 4.7E+15 |
| Example 6 | $Yb_2O_3$/25 mol % $Ho_2O_3$ | 1500 | 9.02 | 0.3 | 160 | <0.1 | 260 | $Yb_2O_3$—$Ho_2O_3$ss | 2.2E+15 |
| Example 7 | $Yb_2O_3$/25 mol % $Er_2O_3$ | 1500 | 9.08 | 0.1 | 180 | <0.1 | 246 | $Yb_2O_3$—$Er_2O_3$ss | 6.8E+16 |
| Comparative example 1 | $Y_2O_3$ | 1500 | 5.04 | 0.1 | 150 | <0.1 | 280 | $Y_2O_3$ | 2.3E+16 |
| Comparative example 2 | $Al_2O_3$ | 1700 | 3.98 | <0.1 | 350 | 0.5 | 623 | $Al_2O_3$ | 5.5E+16 |
| Comparative example 3 | $Yb_2O_3$ | 1300 | 8.5 | 4.6 | <100 | <0.1 | 294 | $Yb_2O_3$ | — |
| Comparative example 4 | $Gd_2O_3$ | 1500 | 7.36 | 2.5 | <100 | <0.1 | 343 | $Gd_2O_3$ | — |

TABLE 1-continued

| Composition | Raw material | Firing temperature (° C.) | Bulk density (g/cm$^3$) | Open porosity (%) | Strength (Mpa) | Amount of impurity metals (wt %) | NF$_3$ Etching rate (nm/h) | Crystal phase | Volume resistivity (Ω·cm) |
|---|---|---|---|---|---|---|---|---|---|
| Comparative example 5 | Eu$_2$O$_3$ | 1500 | 7.8 | 0.2 | <100 | <0.1 | 301 | Eu$_2$O$_3$ | — |
| Comparative example 6 | Nd$_2$O$_3$ | 1500 | — | — | — | — | — | — | — |

Examples 8 to 15

In Examples 8 to 15, a mixed powder of a rare-earth oxide and a fluoride of group 2 element (alkaline-earth metal) was used and a corrosion-resistant member for semiconductor manufacturing apparatus was produced. Concretely, initially, a rare-earth oxide and a fluoride of group 2 element shown in Table 2 were weighed, and were wet-mixed for 4 hours, where isopropyl alcohol was employed as a solvent, and a nylon pot and alumina balls having a diameter of 5 mm were used. After mixing, a slurry was taken out and was dried in a nitrogen gas stream at 110° C. Subsequently, a mixed powder was produced by passing through a 30 mesh sieve. Then, the resulting mixed powder was subjected to uniaxial pressure forming at a pressure of 200 kgf/cm$^2$, so that a disc-shaped compact having a diameter of about 35 mm and a thickness of about 10 mm was produced and was stored into a graphite mold for firing. Thereafter, firing was performed by using a hot-press method at a predetermined firing temperature (Table 2), so as to obtain a corrosion-resistant member for semiconductor manufacturing apparatus. The press pressure during firing was specified to be 200 kgf/cm$^2$ and an Ar atmosphere was kept until the firing was finished. The retention time at the firing temperature (maximum temperature) was specified to be 4 hours. In this regard, the expression "Yb$_2$O$_3$/1 vol % MgF$_2$" in Table 2 refers to a mixed powder in which 1 percent by volume of MgF$_2$ is added to 100 percent by volume of Yb$_2$O$_3$.

Each of the resulting sintered bodies was worked for various evaluations, and the same evaluations as those described above were performed. Each evaluation result is as shown in Table 2.

In Examples 8 and 9, a predetermined amount of MgF$_2$ as shown in Table 2 was added to Yb$_2$O$_3$, and densification was performed at a firing temperature of 1,300° C. As a result, MgF$_2$ reacted with Yb$_2$O$_3$ during sintering, and granular MgO and YbOF phases were formed in a Yb$_2$O$_3$ matrix (refer to FIG. 1). In spite of the fact that the firing temperature was low as compared with the firing temperature in Example 1, dense sintering became possible by addition of the fluoride, and the corrosion resistance was equivalent to that in Example 1. Furthermore, dispersed grain boundary phases were introduced and, thereby, the strength became higher than that in Example 1.

Figure 2:
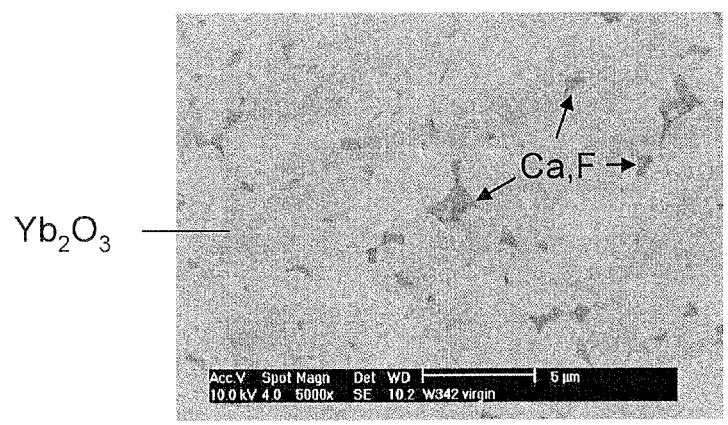
FIG. 2 is a secondary electron image of a cross-section (polished surface) of a sintered body in Example 9.

In Examples 10 and 11, a predetermined amount of CaF$_2$ as shown in Table 2 was added to Yb$_2$O$_3$, and densification was performed at a firing temperature of 1,200° C. to 1,300° C. As a result, grain boundary phases primarily containing Ca, F were formed in a Yb$_2$O$_3$ matrix (refer to FIG. 2). In spite of the fact that the firing temperature was low as compared with the firing temperature in Example 1, enough densification proceeded by addition of the fluoride, and the corrosion resistance was almost equivalent to that in Example 1. Furthermore, dispersed grain boundary phases were introduced and, thereby, the strength became higher than that in Example 1.

In Examples 12 and 13, a predetermined amount of MgF$_2$ as shown in Table 2 was added to Ho$_2$O$_3$, and densification was performed at a firing temperature of 1,300° C. As a result, MgF$_2$ reacted with Ho$_2$O$_3$ during sintering, and granular MgO and HoOF phases were formed in a Ho$_2$O$_3$ matrix as with Examples 8 and 9. In Examples 12 and 13, in spite of the fact that the firing temperature was low as compared with the firing temperature in Example 3, enough densification proceeded by addition of the fluoride, and the corrosion resistance was equivalent to that in Example 3. Furthermore, dispersed grain boundary phases were introduced and, thereby, the strength became higher than that in Example 3.

In Examples 14 and 15, a predetermined amount of CaF$_2$ as shown in Table 2 was added to Ho$_2$O$_3$, and densification was performed at a firing temperature of 1,300° C. As a result, grain boundary phases primarily containing Ca, F were formed in a Yb$_2$O$_3$ matrix as with Examples 10 and 11. In Examples 14 and 15, in spite of the fact that the firing temperature was low as compared with the firing temperature in Example 3, enough densification proceeded by addition of the fluoride, and the corrosion resistance was almost equivalent to that in Example 3. Furthermore, dispersed grain boundary phases were introduced and, thereby, the strength became higher than that in Example 3.

The materials in Examples 9 to 11 and 13 to 15 had high volume resistivities of 1×10$^{15}$ Ω·cm or more and were suitable for electrostatic chucks and heater materials. Meanwhile, the same characteristics are expected with respect to Examples 8 and 12.

TABLE 2

| Composition | Raw material | Firing temperature (° C.) | Bulk density (g/cm$^3$) | Open porosity (%) | Strength (Mpa) | Amount of impurity metals (wt %) | NF$_3$ Etching rate (nm/h) | Crystal phase | Volume resistivity (Ω·cm) |
|---|---|---|---|---|---|---|---|---|---|
| Example 8 | Yb$_2$O$_3$/1 vol % MgF$_2$ | 1300 | 9.1 | 0.2 | 150 | <0.1 | 229 | Yb$_2$O$_3$, MgO, YbOF | — |
| Example 9 | Yb$_2$O$_3$/5 vol % MgF$_2$ | 1300 | 8.94 | 0.3 | 170 | <0.1 | 225 | Yb$_2$O$_3$, MgO, YbOF | 4.5E+15 |
| Example 10 | Yb$_2$O$_3$/1 vol % CaF$_2$ | 1200 | 9.12 | 0.1 | 150 | <0.1 | 246 | Yb$_2$O$_3$ | 1.6E+15 |
| Example 11 | Yb$_2$O$_3$/5 vol % CaF$_2$ | 1300 | 8.88 | <0.1 | 160 | <0.1 | 228 | Yb$_2$O$_3$ | 1.0E+15 |
| Example 12 | Ho$_2$O$_3$/1 vol % MgF$_2$ | 1300 | 8.3 | 0.2 | 165 | <0.1 | 252 | Ho$_2$O$_3$, MgO, HoOF | — |
| Example 13 | Ho$_2$O$_3$/5 vol % MgF$_2$ | 1300 | 8.23 | <0.1 | 170 | <0.1 | 249 | Ho$_2$O$_3$, MgO, HoOF | 1.0E+15 |

TABLE 2-continued

| Composition | Raw material | Firing temperature (° C.) | Bulk density (g/cm³) | Open porosity (%) | Strength (Mpa) | Amount of impurity metals (wt %) | NF$_3$ Etching rate (nm/h) | Crystal phase | Volume resistivity (Ω·cm) |
|---|---|---|---|---|---|---|---|---|---|
| Example 14 | Ho$_2$O$_3$/1 vol % CaF$_2$ | 1300 | 8.32 | <0.1 | 160 | <0.1 | 254 | Ho$_2$O$_3$ | 1.7E+15 |
| Example 15 | Ho$_2$O$_3$/5 vol % CaF$_2$ | 1300 | 8.18 | <0.1 | 165 | <0.1 | 256 | Ho$_2$O$_3$ | 3.9E+15 |

Examples 16 to 20

In Examples 16 and 17, the sintered body (Yb$_2$O$_3$.1,500° C. fired product) obtained in Example 1 was worked to have a thickness of 1 mm and was subjected to an annealing treatment in the air at 1,100° C. for 10 hours and at 1,200° C. for 10 hours, respectively. Meanwhile, in Example 18, the sintered body (Yb$_2$O$_3$.1,800° C. fired product) obtained in Example 5 was worked to have a thickness of 1 mm and was subjected to an annealing treatment in the air at 1,200° C. for 10 hours, and in Examples 19 and 20, the sintered body (Yb$_2$O$_3$—Ho$_2$O$_3$ solid solution and Yb$_2$O$_3$—Er$_2$O$_3$ solid solution, respectively) obtained in Examples 6 and 7, respectively, were worked to have a thickness of 1 mm and were subjected to an annealing treatment in the air at 1,200° C. for 10 hours.

Each of the resulting products annealing-treated in the air was worked for various evaluations, and the same evaluations as those described above (excluding the strength) were performed. Each evaluation result is as shown in Table 3.

In each of Examples 16 to 20, the corrosion resistance was improved and the volume resistivity increased as compared with those of the sintered body before being subjected to the annealing treatment in the air. Furthermore, in each of Examples 16 to 20, the color tone changed to whitish as compared with that of the sintered body before being subjected to the annealing treatment in the air. Concretely, the Yb$_2$O$_3$ fired product changed from ivory to white (Examples 16 to 18), the Yb$_2$O$_3$—Ho$_2$O$_3$ solid solution changed from orange brown to orange white (Example 19), and the Yb$_2$O$_3$—Er$_2$O$_3$ solid solution changed from red brown to pink (Example 20). It is estimated that oxygen deficiency and the like included in the sintered body were reduced by being subjected to the annealing treatment after firing, the crystallinity was improved and, thereby, the corrosion resistance and the volume resistivity were improved significantly.

The present application claims priority from Japanese Patent Application No. 2010-079251 filed on Mar. 30, 2010, the entire contents of which are incorporated in the present specification by reference.

INDUSTRIAL APPLICABILITY

The present invention can be applied to a semiconductor manufacturing apparatus utilized for performing a dry process, plasma coating, or the like in production of a semiconductor.

The invention claimed is:

1. A corrosion-resistant member for a semiconductor manufacturing apparatus, comprising a sintered body having an open porosity of 0.3% or less and consisting essentially of at least one type of rare-earth oxide selected from the group consisting of Yb$_2$O$_3$, Ho$_2$O$_3$, Dy$_2$O$_3$ and Er$_2$O$_3$, wherein grain boundary phases containing at least one type selected from the group consisting of Mg, Ca, and Sr and at least one type of O and F are dispersed in the sintered body.

2. The corrosion-resistant member for a semiconductor manufacturing apparatus according to claim 1, wherein the sintered body containing Yb$_2$O$_3$ has a bulk density of 8.8 to 9.2 g/cm³.

3. The corrosion-resistant member for a semiconductor manufacturing apparatus according to claim 1, wherein the sintered body containing Ho$_2$O$_3$ has a bulk density of 8.1 to 8.4 g/cm³.

4. The corrosion-resistant member for a semiconductor manufacturing apparatus according to claim 1, wherein the sintered body containing Yb$_2$O$_3$ has a bulk density of 8.8 to 9.2 g/cm³.

5. The corrosion-resistant member for a semiconductor manufacturing apparatus according to claim 1, wherein the sintered body containing Ho$_2$O$_3$ has a bulk density of 8.1 to 8.4 g/cm³.

6. The corrosion-resistant member for a semiconductor manufacturing apparatus according to claim 1, wherein an amount of impurity metals in the sintered body is 0.1 wt % or less with respect to a total weight of the rare-earth oxide.

TABLE 3

| Composition | Raw material | Firing temperature (° C.) | Annealing treatment in the air | Bulk density (g/cm³) | Open porosity (%) | Strength (Mpa) | Amount of impurity metals | NF$_3$ Etching rate (nm/h) | Crystal phase | Volume resistivity (Ω·cm) |
|---|---|---|---|---|---|---|---|---|---|---|
| Example 16 | Yb$_2$O$_3$ | 1500 | 1100° C.10 h | 9.19 | 0.1 | — | <0.1 | 216 | Yb$_2$O$_3$ | 8.5E+15 |
| Example 17 | Yb$_2$O$_3$ | 1500 | 1200° C.10 h | 9.19 | 0.1 | — | <0.1 | 210 | Yb$_2$O$_3$ | 3.7E+16 |
| Example 18 | Yb$_2$O$_3$ | 1800 | 1200° C.10 h | 9.2 | <0.1 | — | <0.1 | 201 | Yb$_2$O$_3$ | 5.1E+16 |
| Example 19 | Yb$_2$O$_3$/20 mol % Ho2O3 | 1500 | 1200° C.10 h | 9.02 | 0.3 | — | <0.1 | 235 | Yb$_2$O$_3$—Ho$_2$O$_3$ss | 4.1E+16 |
| Example 20 | Yb$_2$O$_3$/20 mol % Er2O3 | 1500 | 1200° C.10 h | 9.08 | 0.1 | — | <0.1 | 224 | Yb$_2$O$_3$—Er$_2$O$_3$ss | 2.1E+17 |

7. A method for manufacturing a corrosion-resistant member for a semiconductor manufacturing apparatus, comprising the step of:

subjecting at least one type of rare-earth oxide raw material selected from the group consisting of $Yb_2O_3$, $Ho_2O_3$, $Dy_2O_3$ and $Er_2O_3$ to (a) forming into the shape of a desired corrosion-resistant member for semiconductor manufacturing apparatus without using a sintering aid and, thereafter, hot-press firing in an inert atmosphere at a predetermined firing temperature or (b) forming into the shape of a desired corrosion-resistant member for semiconductor manufacturing apparatus together with a sintering aid which is a fluoride of at least one type of element selected from the group consisting of Mg, Ca, and Sr and, thereafter, hot-press firing in an inert atmosphere at a temperature lower than the predetermined firing temperature, so as to sinter the oxide raw material and obtain a sintered body having an open porosity of 0.3% or less.

8. The method for manufacturing a corrosion-resistant member for a semiconductor manufacturing apparatus, according to claim 7, wherein an annealing treatment in the air is performed at 1,000° C. or higher after the sintered body having an open porosity of 0.3% or less is obtained by sintering the oxide raw material.

9. The method for manufacturing a corrosion-resistant member for a semiconductor manufacturing apparatus according to claim 7, wherein an amount of impurity metals is 0.1 wt % or less with respect to a total weight of the rare-earth oxide raw material.

* * * * *